(12) United States Patent
Weng et al.

(10) Patent No.: US 11,702,558 B2
(45) Date of Patent: Jul. 18, 2023

(54) PIGMENTED INKJET INK WITH HIGH ACID NUMBER ACRYLIC RESIN

(71) Applicant: VIDEOJET TECHNOLOGIES INC., Wood Dale, IL (US)

(72) Inventors: Wei Weng, Naperville, IL (US); Fengfei Xiao, Glenview, IL (US); Godwin Deng, Schaumberg, IL (US); Linfang Zhu, Woodridge, IL (US)

(*) Notice: Subject to any disclaimer, the term of this patent is extended or adjusted under 35 U.S.C. 154(b) by 211 days.

(21) Appl. No.: 17/033,216

(22) Filed: Sep. 25, 2020

(65) Prior Publication Data

US 2022/0098429 A1    Mar. 31, 2022

(51) Int. Cl.
| | | |
|---|---|---|
| C09D 11/38 | (2014.01) | |
| C09D 11/328 | (2014.01) | |
| C09D 11/107 | (2014.01) | |
| C09D 11/033 | (2014.01) | |
| B41M 7/00 | (2006.01) | |
| B41M 5/00 | (2006.01) | |
| C09D 11/322 | (2014.01) | |
| C08K 3/32 | (2006.01) | |
| C08K 5/372 | (2006.01) | |
| C08K 5/19 | (2006.01) | |

(52) U.S. Cl.
CPC .......... C09D 11/38 (2013.01); B41M 5/0023 (2013.01); B41M 7/0027 (2013.01); C09D 11/033 (2013.01); C09D 11/107 (2013.01); C09D 11/322 (2013.01); C09D 11/328 (2013.01); *C08K 5/19* (2013.01); *C08K 5/3725* (2013.01); *C08K 2003/321* (2013.01)

(58) Field of Classification Search
CPC ..... C09D 11/326; C09D 11/107; C09D 11/03; C09D 11/037; C09D 11/033; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41J 3/4078; B41J 11/0021; B41J 11/002; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 2/1623; B41J 2202/00; B41J 2202/03; B41J 2/14201; B41J 2/045; B41J 11/0015; B41J 2/04581; B41J 2/055; B41J 2002/16502; B41J 2/04588; B41J 2/04595; B41J 2/04586; B41J 2/14274; B41J 2/01; B41J 2/211; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598; B41F 23/042; B41F 23/0436; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 3,674,528 A | 7/1972 | Bronson | |
| 4,677,174 A | 6/1987 | Alexander | |
| 5,183,502 A | 2/1993 | Meichsner | |
| 6,454,846 B2 | 9/2002 | Yatake | |
| 6,569,920 B1 | 5/2003 | Wen | |
| 6,669,768 B2 | 12/2003 | Blease | |
| 6,726,756 B1* | 4/2004 | Zou | C09D 11/30 106/31.89 |
| 6,833,395 B2 | 12/2004 | Rygas | |
| 8,936,358 B2 | 1/2015 | Sao | |
| 10,344,173 B2 | 7/2019 | Takemoto et al. | |
| 2005/0090579 A1* | 4/2005 | Zhu | C09D 11/36 523/160 |
| 2005/0206702 A1* | 9/2005 | Yamashita | B41M 5/0017 347/100 |
| 2007/0197685 A1* | 8/2007 | Aruga | C09D 11/322 523/160 |

(Continued)

FOREIGN PATENT DOCUMENTS

| | | |
|---|---|---|
| WO | 2005040291 A1 | 5/2005 |
| WO | 2020223533 A1 | 11/2020 |

OTHER PUBLICATIONS

Newstetic Acrylic Resin Safety Data Sheet (Version 5; Document# DPDDPR-003; p. 1-7 (Year: 2009).*

(Continued)

*Primary Examiner* — Manish S Shah
(74) *Attorney, Agent, or Firm* — Wolter VanDyke Davis, PLLC; Robert L. Wolter

(57) ABSTRACT

This specification discloses non-aqueous solvent, pigmented ink formulations that are suitable for the electronic and aerospace industries and form printed marks that are resistant to smearing and dissolution by organic solvents commonly used in overcoatings in this industry and others. These ink formulations are based on use of an acidic resin with an inherent acid value of at least about 25 mg KOH/g, preferably at least partially neutralized by a quaternary ammonium hydroxide and/or alcohol amine acid neutralizing or modifying agent.

20 Claims, No Drawings

(56) References Cited

U.S. PATENT DOCUMENTS

| | | |
|---|---|---|
| 2012/0039819 A1 | 2/2012 | Nakatani |
| 2012/0305528 A1 | 12/2012 | Greenberg |
| 2015/0166806 A1* | 6/2015 | Kozee .................. C09D 11/328 |
| | | 347/20 |
| 2015/0252201 A1 | 9/2015 | Ortalano |

OTHER PUBLICATIONS

PCT/US21/52034 International Search Report and Written Opinion, dated Dec. 13, 2021, 9 pages.

* cited by examiner

PIGMENTED INKJET INK WITH HIGH ACID NUMBER ACRYLIC RESIN

BACKGROUND OF THE INVENTION

In inkjet printing, printing is accomplished without contact between the printing device and the substrate on which the printed characters are deposited. Briefly described, inkjet printing involves projecting a stream of ink droplets to a surface and controlling the direction of the stream, e.g., electronically, so that the droplets are caused to form the desired printed image or mark on that surface. This technique of noncontact printing is well suited for application of characters onto a variety of surfaces including porous and non-porous surfaces.

In general, an inkjet ink composition should meet certain requirements to be useful in inkjet printing operations. These relate to viscosity, resistivity, solubility, compatibility of components, and wettability of the substrate. Further, the ink should be quick-drying and smear-resistant, should be capable of passing through the inkjet nozzle without clogging, and should permit rapid cleanup of the machine components with minimum effort. In addition, the jet ink composition should provide printed images that adhere well to the substrates, particularly non-porous substrates, which, as is known to those of ordinary skill in the art pose challenges with respect to achieving image adhesion.

Aerospace parts marking with printed codes or marks is made more difficult by the requirement for the printed marks to be resistant to diesel fuels, jet fuels, bleach, hydraulic fluids, and the like so that they are not smeared or removed by solvents used in the industry and in use of the parts. To achieve exceptional chemical resistance properties, an overcoating is usually applied over the printed area to protect the printed mark from solvents and other chemicals to which it may be exposed. Commercial overcoatings of this type are often referred to as SKYDROL™ resistant. (SKYDROL™ is a commonly used fire-resistant aviation hydraulic fluid that can dissolve and remove printed marks). These overcoatings typically contain polymerizable monomers dissolved in one or more organic solvents, such as propylene glycol monomethyl ether acetate (PM acetate) or methyl isobutyl ketone (MIBK). The current solvent-based pigmented inkjet ink products have poor resistance to such organic solvents. Because of this, the printed marks often will smear or dissolve upon treatment with the overcoating due to the solvents in the overcoating. Therefore, there is a need in the art for inkjet printing ink compositions that are resistant to hydraulic fluids such as SKYDROL™, fuels, and the like.

Commercial inks compatible with SKYDROL™-resistant overcoatings use a water-soluble acrylic resin in a water/alcohol mixed solvent system. This solvent system can result in long dry times due to much slower evaporation of water than typical continuous inkjet (CIJ) ink solvents. Another drawback of the alcohol/water mixed solvent system is that it is difficult to maintain a stable alcohol to water ratio in the ink when environmental conditions change because evaporation of water is highly dependent on humidity in the air that gets into the printer while evaporation of alcohol is less sensitive to humidity. As a result, a makeup with a certain alcohol/water ratio optimized for a certain humidity will not work well in a different humidity, leading to ink compositional changes that can impact print quality and printer operational reliability. As a result, an air drier kit might be required to maintain similar level of air humidity in different environments. Water-based, pigmented ink has other certain intrinsic problems when used in commercial printers, such as foaming. In addition, certain water based commercial inks contain ammonium hydroxide, resulting in a distinct and undesirable ammonia odor. None of these types of inks are ideal for the intended use with an overcoating. Therefore, there is a need in the art for improved overcoating-resistant solvent-based inks.

SUMMARY OF THE INVENTION

This specification therefore provides non-aqueous solvent-pigmented ink formulations that are suitable for the aerospace and electronics industries and form printed marks that are resistant to smearing and dissolution by organic solvents commonly used in overcoatings in this industry and others. These ink formulations are based on use of an acidic resin, typically an acrylic resin with an inherent acid value of at least about 25 mg KOH/g, preferably at least partially neutralized by an acid neutralizing or modifying agent. In the inventive inks, organic base is used instead of the previously used ammonium hydroxide. The combination of the acrylic resin plus the non-volatile organic base is soluble in an organic solvent and does not require a water or aqueous cosolvent as was necessary in the prior art. Removing water from the ink product results in a shorter dry time so that the printed code will be ready for overcoating immediately.

In particular, the invention relates to an inkjet ink composition comprising (a) an acidic resin with an inherent acid value of at least about 25 mg KOH/g; (b) a non-volatile organic acid neutralizing agent present at up to about 10% by weight of the ink composition; (c) one or more volatile organic solvents; and (d) one or more colorants. The printed marks of the inkjet ink compositions preferably are resistant to overcoating.

In certain embodiments, the acidic resin has an acid number of 50 mg KOH/g or an acid number of 100 mg KOH/g.

The acidic resin of the invention can be a homopolymer or copolymer. The preferred acidic resin is an acrylic resin. Exemplary resins are those wherein the acidic resin polymer consists of monomers selected from the group consisting of acrylic acid, methacrylic acid, an alkyl acrylate, a hydroxylalkyl methacrylate, styrene, and vinyl acetate.

Preferably, the acidic resin has a weight-average molecular weight of less than about 80,000 Daltons, or less than about 50,000 Daltons, or less than about 20,000 Daltons.

In certain embodiments, the inkjet ink compositions contain an organic acid neutralizing agent, present at up to about 5% by weight of the ink composition or up to about 3% by weight of the ink composition.

In preferred embodiments, the organic acid neutralizing agent is selected from the group consisting of a quaternary ammonium hydroxide, an alcohol amine, an aromatic amine, a heterocyclic nitrogen compound, and an alkyl amine. The acid neutralizing agent preferably has a boiling point of at least 5° C., or at least 100° C., or at least 200° C., or at least 300° C.

In preferred compositions, the quaternary ammonium hydroxide is selected from the group consisting of tetrabutyl ammonium hydroxide, tetramethyl ammonium hydroxide, tetraethylammonium hydroxide, and tetrapropyl ammonium hydroxide and the alcohol amine is selected from the group consisting of triethanolamine, dimethylethanolamine, methanolamine, N-methylethanolamine, an ethanolamine, and diethanolamine.

In preferred inkjet ink compositions, the one or more volatile organic solvents are present in an amount at least 60% by weight of the ink composition. Preferably, when water is present, it is present in an amount of less than 5% by weight of the ink composition. Preferred organic solvents are selected from the group consisting of a C1-C4 alcohol, a C3-C6 ketone, a C3-C6 ester, a C4-C8 ether, and any mixture thereof. In particular, the organic solvent is selected from the group consisting of methyl ethyl ketone, methyl propyl ketone, methyl isopropyl ketone, n-propyl acetate, isopropyl acetate, n-butyl acetate, t-butyl acetate, methanol, ethanol, and propylene glycol monomethyl ether acetate.

The inkjet ink compositions according to the invention preferably contain a colorant selected from one or more pigment, one or more dye, or any combination thereof. A preferred colorant is titanium dioxide.

In addition, the inventive inkjet inks can comprise or further comprise a colorant selected from the group consisting of C.I. Pigment Violet 23, C.I. Pigment Violet 34, C.I. Pigment Violet 35, C.I. Pigment Violet 37, C.I. Pigment Blue 15:3, C.I. Pigment Blue 15:4, C.I. Pigment Blue 80, C.I. Pigment Yellow 180, C.I. Pigment Yellow 151, C.I. Pigment Yellow 155, C.I. Pigment Yellow 139, C.I. Pigment Black 7 and any mixture thereof; and/or a colorant selected from the group consisting of Orasol Pink 5BLG, Black RLI, Blue 2GLN, Red G, Yellow 2GLN, Blue GN, Blue BLN, Black CN, and Brown CR, Morfast Blue 100, Red 101, Red 104, Yellow 102, Black 101, Black 108, and any mixture thereof.

In another embodiment, the invention includes a method of producing an overcoated printed mark comprising (a) printing by continuous inkjet a mark on a substrate using an inkjet ink composition as described herein; (b) allowing the printed mark to dry; and (c) placing a coating of an overcoating over the printed mark.

DETAILED DESCRIPTION

1. Definitions

Unless defined otherwise, all technical and scientific terms used herein have the same meaning as commonly understood by one of ordinary skill in the art. Although various methods and materials similar or equivalent to those described herein can be used in the practice or testing of the present invention, suitable methods and materials are described below. However, the skilled artisan understands that the methods and materials used and described are examples and may not be the only ones suitable for use in the invention. Moreover, as measurements are subject to inherent variability, any temperature, weight, volume, time interval, pH, salinity, molarity or molality, range, concentration and any other measurements, quantities or numerical expressions given herein are intended to be approximate and not exact or critical figures unless expressly stated to the contrary.

Hence, where appropriate to the invention and as understood by those of skill in the art, it is proper to describe the various aspects of the invention using approximate or relative terms and terms of degree commonly employed in patent applications, such as: about, approximately, substantially, essentially, consisting essentially of, comprising, and effective amount. Unless defined otherwise, all technical and scientific terms used herein have the same meaning as commonly understood by one of ordinary skill in the art.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The term "about," as used herein, means plus or minus 20 percent of the recited value, so that, for example, "about 0.125" means 0.125±0.025, and "about 1.0" means 1.0±0.2.

The term "acrylic resin," as used herein, refers to a glassy thermoplastic made by polymerization of acrylic acid or methacrylic acid, or a derivative of acrylic acid or methacrylic acid, or other related compounds. The "acrylic resin weight-average molecular weight" refers to the average molecular weight of the polymer molecules in the resin. The inherent acid value of a substance (also referred to as the acidity, acid number, or neutralization number) refers to the mass of potassium hydroxide (KOH) in milligrams that is required to neutralize one gram of the substance.

The term "colorant," as used herein, refers to a dye, pigment or other substance that imparts color or modifies the hue of something else, and can refer to any such substance. Colorants include materials that impart a black, white, as well as other colors, and in some embodiments can be food grade, cosmetic grade or pharmacopeia grade colorants. The term "pigment" refers to a substance that imparts black or white or a color to other materials, and usually is a powdered substance that is mixed with a liquid in which it is relatively insoluble and used especially to impart color to coating materials such as paints, inks, plastics, and rubber. The term "dye" refers to a colored substance (including black and white) which usually is soluble in the solvent used and (distinct from a pigment) chemically bonds to the object being colored.

The terms "inkjet" or "ink jet," as used herein, refer to inkjet printing, a type of printing that creates an image by propelling small droplets of ink onto a substrate such as paper, plastic, metal, glass, and the like. "Continuous inkjet" or "CIJ" methods are used, for example, in the marking and coding of products and packages. In this method, a pump directs a liquid ink composition from a reservoir to a nozzle to create a continuous stream of ink droplets, which are subjected to a controlled and variable electrostatic field, and thereby are charged as the droplets form according to the varying electrostatic field. The charged droplets are deflected to the proper location by passing through another electrostatic field to print the desired pattern on a substrate, or are recycled back to the reservoir for future use. An "inkjet ink" is any ink that is suitable for use in an inkjet printer, including a continuous inkjet printer, a thermal inkjet printer, or the like.

The term "acid neutralizing agent," as used herein, refers to a compound or composition that can neutralize the acidic constituents of the material or solution to which it is added. Preferred acid neutralizing agents are non-volatile organic compounds. The concentrations of the acid neutralizing agent(s) in the ink formulation comprise from about 0.1% and up to about 15% by weight of the total ink weight. Exemplary acid neutralizing agents for use with the invention include one or more of triethylamine, dimethylamine, monoethanolamine, N-methylethanolamine, diethanolamine, triethanolamine, tetrabutyl ammonium hydroxide, tetramethyl ammonium hydroxide, tetraethylammonium hydroxide, tetrapropyl ammonium hydroxide, but preferably are triethanolamine, tetrabutyl ammonium hydroxide or a mixture thereof.

The term "printed code" or "printed mark," as used herein, refers to an image created by inkjet printing, including pictures, numbers, symbols, text, or a combination thereof. A "coated printed mark" or "an overcoated printed mark" refers to a printed code that has been overlaid with a protective overcoating.

The terms "smear", "smearing" or "smeared" as used herein, refers to the printed mark, image, or code becoming blurred after the application of the protective topcoat.

The term "solvent," as used herein, refers to a component whose primary function is to dissolve and carry the other components of the ink composition. The term "solvent" also refers to a mixture of solvents. Thus, a solvent suitable for use in this invention can refer to any of the following, as well as mixtures thereof: acetone, methyl ethyl ketone, diethyl ketone, methyl propyl ketone, methyl isopropyl ketone, methyl isobutyl ketone, cyclohexanone, and the like; esters such as methyl acetate, ethyl acetate, n-propyl acetate, isopropyl acetate, n-butyl acetate, t-butyl acetate, amyl acetate, methyl lactate, ethyl lactate, n-propyl lactate, isopropyl lactate, n-butyl lactate, methoxy propanol acetate, and the like; alcohols such as methanol, ethanol, n-propanol, isopropanol, n-butanol, t-butanol, n-pentanol, n-hexanol, benzyl alcohol, and the like; diacetone alcohol; glycol ethers or glycol ether acetates such as methoxy propanol, dipropylene glycol methyl ether, propylene glycol propyl ether, propylene glycol butyl ether, tripropylene glycol methyl ether, butylene glycol methyl ether, dibutylene glycol methyl ether, dipropylene glycol methyl ether acetate, propylene glycol propyl ether acetate, propylene glycol butyl ether acetate and the like; and amides thereof. Preferred solvents include methyl ethyl ketone, ethanol, methoxypropyl acetate, and butyl lactate, as well as mixtures thereof. As used herein, the term "volatile" refers to the tendency of a substance, such as a solvent, to vaporize, related to the vapor pressure of the substance. A volatile solvent is one that has the capability of evaporating or going into a vapor phase. The volatility of a solvent may be based on a relative evaporation rate, usually relative to n-butyl acetate, wherein some solvents are more or less volatile than others. A "volatile organic solvent," therefore, includes any organic solvent that has an evaporation rate of 0.4 or greater where butyl acetate=1.0.

The phrase "substantially free of," as used herein, means that the final composition contains none or a minimal amount (less than 5% by weight) of the stated substance. Therefore, the ink compositions of the invention contain less than 5% by weight water, preferably less than 3% water or less than 2% water, more preferably less than 1% water, and most preferably no detectable water.

The term "substrate," as used herein, refers to the material or the object on which a mark is printed. A non-limiting list of substrates which can be used with the invention include, for example, metal, including painted or coated metal, such as steel and aluminum, glass, plastic, wood, ceramic, composites, uncoated or coated paper, rubbers, wire and cables, electronic components, and the like.

The terms "topcoat" or "overcoating," as used herein, refers to a coating that is applied over a printed mark. The overcoating is designed to protect the printed mark from damage, smearing, or dissolution of the printed mark by solvents (such as diesel fuel, jet fuel, bleach, SKYDROL™, and the like) with which it may come into contact. These topcoats are sometimes referred to as SKYDROL™-resistant topcoats. Commonly used overcoatings used in the aerospace industry include, but are not limited to AkzoNobel 683-3-2/X-310A5Q Clear BAC 900 BAC 5710 Type 41, AA Spec Skydrol® Resistant Polyurethane Topcoat, 3M Scotch-Weld Fuel Resistant Coating EC-776, AkzoNobel ECL-G-101 Gloss Gray BAC707 Eclipse High Solids Polyurethane Topcoat, Henkel Hysol PC18M GAL polyurethane hardener, DOW DC3145, and Momentive RTV 108, and the like.

2. Summary of Results

Printed marks made with inventive inkjet inks showed improved resistance to a popular commercial overcoating, AkzoNobel™ Aerospace Polyurethane Topcoat 683-3-2.

The inventive inkjet inks have good stability.

3. Embodiments of the Invention

In non-aqueous solvent system, the reaction of the acidic group in acrylic resin with the organic acid neutralizing agent forms an ion pairing complex. Compared to inks using inorganic acid neutralizing agents such as ammonia, the organic acid neutralizing agents significantly improve the solubility of ionized acrylic resin in organic solvents while improving the chemical resistance of printed codes, marks or images made with those inks to organic solvents such as PM acetate or MIBK.

In general, an inkjet ink composition should meet certain requirements to be useful in inkjet printing operations, as is known in the art. These relate to viscosity, resistivity, solubility, compatibility of components, and wettability of the substrate. Further, the ink should be quick-drying and smear-resistant, should be capable of passing through the inkjet nozzle without clogging, and should permit rapid cleanup of the machine components with minimum effort. In addition, the jet ink composition should provide printed images that adhere well to the substrates, particularly non-porous substrates, which, as is known to those of ordinary skill in the art pose challenges with respect to achieving image adhesion.

The present invention, in a preferred embodiment, contains an acrylic resin with an inherent acid value of at least about 25 mg KOH/g. Monomers which are suitable for use in producing the polymeric acidic resin include acid-group-containing monomers with carboxylic acid groups, sulfonic acid group or phosphonic acid groups, and other monomers such as styrene, vinyl acetate, methyl methacrylate, ethyl acrylate, 2-ethyl hexyl acrylate, n-butyl acrylate, isobutyl methacrylate, ethyl methacrylate and the like, but most preferably styrene acrylic resin. Acrylic resins suitable for use in the invention include, but are not limited to Joncryl™ 67, Joncryl™ 678, Joncryl™ 586, Neocryl B-819, Neocryl B-851, and mixtures thereof. Preferred acrylic resins are Joncryl™ 67 and Joncryl™ 678.

The weight average molecular weight of preferred resins is less than about 80,000 Daltons. In other embodiments, the weight average molecular weight of the acrylic resin is about 800 Daltons to about 50,000 Daltons, or about 1000 Daltons to about 30,000 Daltons, or about 2000 Daltons to about 20,000 Daltons. The most preferred acrylic resins have a weight average molecular weight of about 1000 Daltons to about 20,000 Daltons.

The inherent acid value of the preferred resins is at least about 25 mg KOH/g, more preferably at least about 50 mg KOH/g, and most preferably at least about 100 mg KOH/g.

In preferred embodiments, the inventive ink compositions also contains up to about 10% by weight of a non-volatile organic acid neutralizing agent. More preferably, the acid neutralizing agents represent up to about 5% or up to about 3% of the total ink weight. Suitable ranges of organic acid neutralizing agent can easily be determined by the person of skill, but generally are from about 0.1% to about 15% by weight of the total ink composition. A preferred range is from about 0.3% to about 10% by weight of the total ink composition, or about 0.4% to about 5% by weight of the total ink composition, or about 0.4% to about 3% by weight of the total ink composition.

The boiling point of the acid neutralizing agent is at least 5° C. Preferably, the boiling point of the acid neutralizing agent is at least 100° C., more preferably at least 200° C., and most preferably at least 300° C.

Preferred embodiments of the invention contain one or more acid neutralizing agents which include, but are not limited to, quaternary ammonium hydroxides, alcohol amines, or a mixture thereof. Preferred quaternary ammonium hydroxide compounds include, but are not limited to tetrabutyl ammonium hydroxide, tetramethyl ammonium hydroxide, tetraethylammonium hydroxide, tetrapropyl ammonium hydroxide, and mixtures thereof. The most preferred quaternary ammonium hydroxide compound is tetrabutyl ammonium hydroxide. Preferred alcohol amine compounds include, but are not limited to, triethanolamine, dimethylethanolamine, methanolamine, N-methylethanolamine, an ethanolamine, diethanolamine, and mixtures thereof. The most preferred alcohol amine compound is triethanolamine.

In preferred embodiments, the inks of the present invention contain a solvent or solvent system composed of one or more volatile organic solvents. Suitable solvents include, but are not limited to C1-C4 alcohols, C3-C6 ketones, C3-C6 esters, C4-C8 ethers, and any mixture thereof. For example, alcohols such as methanol, ethanol, n-propyl alcohol, iso-propyl alcohol, n-butyl alcohol, isobutyl alcohol, tert-butyl alcohol can be used. Ketones such as methyl ethyl ketone, diethyl ketone, methyl propyl ketone, methyl isopropyl ketone, methyl isobutyl ketone, esters such as methyl acetate, ethyl acetate, n-propyl acetate, isopropyl acetate, n-butyl acetate, t-butyl acetate, amyl acetate, methyl lactate, ethyl lactate, n-propyl lactate, isopropyl lactate, n-butyl lactate, and ethers such as dipropylene gycol methyl ether, propylene glycol propyl ether, propylene glycol butyl ether, tripropylene glycol methyl ether, butylene glycol methyl ether, and dibutylene glycol methyl ether are useful for the invention, and can be used in a solvent mixture or solvent system of two or more solvents. Preferred solvents are methyl ethyl ketone, ethanol, and a mixture thereof.

Water preferably is not added to the ink composition. However, residual water may be present incidentally in other components of the ink or may become incorporated from the atmosphere. Therefore, the inks of the invention preferably contain no or minimal water. Water may be present up to 5% by weight of the final composition, preferably less than 5% by weight, or less than 4% by weight, or less than 3% by weight, or less than 2% by weight or less than 1% by weight of the final ink composition. Preferred inks contain less than 1% water.

Inks according to the invention contain a colorant, including one or more pigment, one or more dye, or a combination thereof. Suitable pigments for use in the invention include, but are not limited to titanium dioxide, C.I. Pigment Violet 23, C.I. Pigment Violet 34, C.I. Pigment Violet 35, C.I. Pigment Violet 37, C.I. Pigment Blue 15:3, C.I. Pigment Blue 15:4, C.I. Pigment Blue 80, C.I. Pigment Yellow 180, C.I. Pigment Yellow 151, C.I. Pigment Yellow 155, C.I. Pigment Yellow 139, and any mixture thereof. The preferred pigment is titanium dioxide. Preferred dyes for use in the invention include, but are not limited to Orasol Pink 5BLG, Black RLI, Blue 2GLN, Red G, Yellow 2GLN, Blue GN, Blue BLN, Black CN, and Brown CR, Morfast Blue 100, Red 101, Red 104, Yellow 102, Black 101, Black 108, and any mixture thereof. The preferred dyes are Yellow 2GLN and Yellow 102. The colorant in the ink can be one or more pigment, one or more dye, or a combination of one or more pigments and one or more dyes.

Other components that may be included in the inks according to the invention include, but are not limited to chemical reagents, plasticizers (e.g., Rit-Cizer #8), defoamers (e.g., BYK-065), acrylic paste (e.g., white acrylic paste 29W599), electrolytes (e.g., tetrabutylammonium hexafluorophosphate), non-acrylic resins (e.g., Staybelite™ Ester 10E), fillers, and dispersants (e.g., Solsperse™ 41000).

Preferably, the ink compositions of the invention have a viscosity in the range of about 2.0 cps to about 6.0 cps at 25° C. More preferably the viscosity is about 3 cps to about 5 cps at 25° C. and most preferably about 3.5 cps to about 4.5 cps at 25° C.

Preferably, the ink compositions of the invention have a resistivity in the range of about 500 Ω-cm to about 2500 Ω-cm at 25° C. More preferably, the resistivity is about 800 Ω-cm to about 2000 Ω-cm and most preferably about 800 Ω-cm to about 1600 Ω-cm at 25° C.

The inks according to the invention are made by combining the ingredients together and mixing. In preferred ink compositions, the ink is produced by the method of: weighing out the solvent, resin and chemical agents into a mixing tank and starting agitation until a clear homogeneous solution is formed; weighing out the pigment paste/dye and adding to the mix with agitation. The final ink was filtered through membrane filters to remove big particles.

In certain embodiments, the invention relates to a method of producing a printed mark which can be overcoated without dissolution or smearing. Thus, the final ink product when printed and dried, should not be soluble in the solvents used in the overcoating composition to any appreciable degree. These solvents usually are propylene glycol monomethyl ether acetate (PM acetate), methyl isobutyl ketone (MIBK), methyl amyl ketone (MAK), xylene, ethanol and mixtures thereof.

The inks of this invention preferably are applied to the substrate by inkjet printing, most preferably continuous inkjet printing. The substrates on which the printing occurs preferably are metal, such as aluminum and steel, hard plastics such as acrylonitrile butadiene styrene (ABS). Other substrates which can be used for printing with the inventive inks include, but are not limited to ceramics, composites, coated and uncoated papers, soft plastics, and glass.

The inkjet printing method preferred for printing with the inventive inks is continuous inkjet printing, however other methods such as thermal inkjet printing and piezo inkjet printing also can be used.

Therefore, in certain embodiments, the invention relates to a method for producing a printed mark comprising printing a mark on a substrate using an inventive inkjet ink as described herein, allowing the printed mark to dry, and optionally placing an overcoating over the printed mark.

5. Examples

This invention is not limited to the particular processes, compositions, or methodologies described, as these may vary. The terminology used in the description is for the purpose of describing the particular versions or embodiments only, and is not intended to limit the scope of the present invention which will be limited only by the appended claims. Although any methods and materials similar or equivalent to those described herein can be used in the practice or testing of embodiments of the present invention, the preferred methods, devices, and materials are now described. All publications mentioned herein, are incorporated by reference in their entirety; nothing herein is to be construed as an admission that the invention is not entitled to antedate such disclosure by virtue of prior invention.

Example 1: Inkjet Inks Containing High Acid Number Acrylic Resin and Tetrabutylammonium Hydroxide Ink compositions were formulated with the components (in percent by weight) shown in Table 1, below. All of these compositions contain a high acid number acrylic resin and a tetrabutylammonium hydroxide acid neutralizing agent.

TABLE 1

| Ink Components | Ink Composition 1 | Ink Composition 2 | Ink Composition 3 | Ink Composition 4 | Ink Composition 5 |
|---|---|---|---|---|---|
| Inkjet Ink Compositions. | | | | | |
| MEK | 52.3% | 55.3% | 54.4% | 54.8% | 56.2% |
| Joncryl 67 | 12.5% | 14.5% | 12.5% | | 14.0% |
| Joncryl 678 | | | | 15.0% | |
| Ethanol | 10.0% | 10.0% | 10.0% | 10.0% | 10.0% |
| Tetrabutylammonium hexafluorophosphate | 0.8% | 0.8% | 1.2% | 0.8% | |
| Potassium thiocyanate | | | | | 0.4% |
| Tetrabutylammonium hydroxide 40% solution | 7.0% | 2.5% | 1.0% | 2.5% | 2.5% |
| Rit-cizer ™ #8 | 0.5% | | | | |
| BYK - 065 | 0.9% | 0.9% | 0.9% | 0.9% | 0.9% |
| White Acrylic Paste 29W599 | 16.0% | 16.0% | 20.0% | 16.0% | 16.0% |
| Total | 100.0% | 100.0% | 100.0% | 100.0% | 100.0% |
| Viscosity (cps at 25° C.) | 4.60 | 4.54 | 3.60 | 3.88 | 4.33 |
| Resistivity (Ω-cm at 25° C.) | 686 | 1249 | 1184 | 1352 | 1303 |

Example 2. Inkjet Inks Containing High Acid Number Acrylic Resin and Triethanolamine Ink compositions were formulated with the components (in percent by weight) shown in Table 2, below. All of these compositions contain a high acid number acrylic resin and a triethanolamine acid neutralizing agent.

TABLE 2

| Ink Components | Ink Composition 6 | Ink Composition 7 |
|---|---|---|
| Ink Compositions. | | |
| MEK | 44.4% | 49% |
| Joncryl 67 | 12.0% | 12% |
| Ethanol | 20% | 20% |
| TBAPF6 | 1.2% | |
| Potassium thiocyanate | | 0.6% |
| Triethanolamine | 1.5% | 1.5% |
| BYK - 065 | 0.9% | 0.9% |
| White Acrylic Paste 29W599 | 20.0% | 16.0 |
| Total | 100.0% | 100.0% |
| Viscosity (cps at 25° C.) | 4.33 | 4.35 |
| Resistivity (Ω-cm at 25° C.) | 1368 | 1316 |

Example 3. Inkjet Inks Containing High Acid Number Acrylic Resin without an Acid Neutralizing Agent Ink compositions were formulated with the components (in percent by weight) shown in Table 3, below. All of these compositions contain a high acid number acrylic resin without any acid neutralizing agent.

TABLE 3

Ink Compositions.

| Ink Components | Ink Composition 8 | Ink Composition 9 |
|---|---|---|
| MEK | 57.3% | 57.8% |
| Joncryl 67 | 13.0% | 14.0% |
| Staybelite Ester 10-E Ester of Hydrogenated Rosin | 1.5% | |
| Ethanol | 8% | 8% |
| Tetrabutylammonium hexafluorophosphate | 1.3% | 1.3% |
| Rit-cizer ™ #8 | 0.5% | 0.5% |
| BYK - 065 | 0.9% | 0.9% |
| White Acrylic Paste 29W599 | 17.5% | 17.5% |
| Total | 100.0% | 100.0% |
| Viscosity (cps at 25° C.) | 3.58 | 3.61 |
| Resistivity (Ω-cm at 25° C.) | 1221 | 1189 |

Example 4. AkzoNobel 683-3-2/X-310 (Mix Ration 2/1) Testing on Printed Codes

For these tests, a code was printed on acrylonitrile butadiene styrene (ABS), steel or aluminum and covered with 2 or 5 layers of AkzoNobel 683-3-2/X-310 (mix ration 2/1) according to the following method: mixing base solution 683-3-2 with curing solution X-310 in 2 to 1 ratio thoroughly; brush applying wet overcoating on the printed code; and letting it dry at ambient temperature before further testing.

As shown in the Table 4, below, the inks containing a high acid number acrylic resin, with or without a acid neutralizing agent, remained intact after overcoating, while two prior art commercial inks either smeared or were illegible.

TABLE 4

Results of Overcoating Tests.

| INK | 2 layers of overcoating | | | 5 layers of overcoating | | |
|---|---|---|---|---|---|---|
|  | ABS | Steel | Aluminum | ABS | Steel | Aluminum |
| Ink Composition 1 | intact | intact | intact | intact | intact | intact |
| Ink Composition 2 | intact | intact | intact | intact | intact | intact |
| Ink Composition 3 | intact | intact | intact | intact | intact | intact |
| Ink Composition 4 | intact | intact | intact | intact | intact | intact |
| Ink Composition 5 | intact | intact | intact | intact | intact | intact |
| Ink Composition 6 | intact | intact | intact | intact | intact | intact |
| Ink Composition 7 | intact | intact | intact | intact | intact | intact |
| Ink Composition 8 | intact | intact | intact | intact | intact | intact |
| Ink Composition 9 | intact | intact | intact | intact | intact | intact |
| Commercial Ink 1 | smear | smear | smear | smear | smear | smear |
| Commercial Ink 2 | illegible | illegible | illegible | illegible | illegible | illegible |

Example 5. Cotton Swab Rub Tests

Cotton Swab Rub Tests were performed on printed marks on various substrates, using PM acetate or methyl isobutyl ketone (MIBK) solvent. A cotton swab, wetted with PM acetate or MIBK was used to rub the printed mark to evaluate whether the ink is easily removed by the solvent or remains intact and affixed. The ink and the substrate on which the mark was printed are indicated in Table 5. The number of rubs with the swab needed to remove more than 50% of the printed mark is used to grade the solvent resistance. (Poor: 1-2 rubs; Fair: 3-5 rubs; Good: 6-9 rubs; Excellent: 10+ rubs). See Table 5, below, for the results.

TABLE 5

Swab Test Results.

| INK | PM acetate rub test | | | | MIBK rub test | | | |
|---|---|---|---|---|---|---|---|---|
|  | RYTON ™ PPS | Steel | Nickel | ABS | RYTON ™ PPS | Steel | Nickel | ABS |
| Commercial Ink 1 | Poor | Poor | Poor | Poor | Fair | Fair | Poor | Poor |
| Commercial Ink 2 | Poor | Fair | Poor | Poor | Poor | Poor | Poor | Poor |
| Ink Composition 2 | Good | Excellent | Fair | Excellent | Good | Excellent | Fair | Excellent |

TABLE 5-continued

Swab Test Results.

| | PM acetate rub test | | | | MIBK rub test | | | |
|---|---|---|---|---|---|---|---|---|
| INK | RYTON™ PPS | Steel | Nickel | ABS | RYTON™ PPS | Steel | Nickel | ABS |
| Ink Composition 6 | Good | Excellent | Fair | Excellent | Good | Excellent | Fair | Excellent |
| Ink Composition 9 | Fair | Good | Fair | Good | Good | Excellent | Fair | Good |

PPS: poly(p-phenylene sulfide); ABS: acrylonitrile butadiene styrene.

REFERENCES

All references listed below and throughout the specification are hereby incorporated by reference in their entirety.
1. U.S. Pat. No. 4,677,174
2. United States Patent Publication No. 2012/0305528
3. U.S. Pat. No. 6,569,920
4. United States Patent Publication No. 2015/0252201
5. United States Patent Publication No. 2012/0039819
6. U.S. Pat. No. 5,183,502
7. U.S. Pat. No. 8,936,358
8. U.S. Pat. No. 3,674,528
9. U.S. Pat. No. 6,833,395
10. U.S. Pat. No. 6,669,768
11. U.S. Pat. No. 6,454,846

The invention claimed is:

1. An overcoating resistant inkjet ink composition comprising:
   (a) an acidic resin with an inherent acid value of 25 mg KOH/g to less than 50 mg KOH/g;
   (b) a non-volatile monoamine organic acid neutralizing agent present at about 0.3% to about 10% by weight of the ink composition;
   (c) at least 60% of one or more volatile organic solvents; and
   (d) one or more colorants, which is resistant to smearing by overcoating compositions, and which contains less than 1% water.

2. The inkjet ink composition of claim 1, wherein the acidic resin is an acrylic resin comprising monomers selected from the group consisting of acrylic acid, methacrylic acid, an alkyl acrylate, a hydroxyalkyl methacrylate, styrene, vinyl acetate and any mixture thereof.

3. The inkjet ink composition of claim 1, wherein the acidic resin has an average weight-average of less than about 80,000 Daltons.

4. The inkjet ink composition of claim 1, wherein the organic acid neutralizing agent is present at up to about 5% by weight of the ink composition.

5. The inkjet ink composition of claim 1, wherein the acid neutralizing agent has a boiling point of at least about 5° C.

6. The inkjet ink composition of claim 1, wherein the one or more organic solvents are selected from the group consisting of a C1-C4 alcohol, a C3-C6 ketone, a C3-C6 ester, a C4-C8 ether, and any mixture thereof.

7. The inkjet ink composition of claim 1, wherein the one or more organic solvents is selected from the group consisting of methyl ethyl ketone, methyl propyl ketone, methyl isopropyl ketone, n-propyl acetate, isopropyl acetate, n-butyl acetate, t-butyl acetate, methanol, ethanol, propylene glycol monomethyl ether acetate and any mixture thereof.

8. A method of producing an overcoated printed mark comprising:
   (a) printing by continuous inkjet a mark on a substrate using the inkjet ink composition of claim 1;
   (b) allowing the printed mark to dry; and
   (c) placing a coating of an overcoating over the printed mark.

9. An overcoated printed mark comprising:
   (a) a overcoating resistant printed mark made using the inkjet ink composition of claim 1 and
   (b) an overcoating composition.

10. An overcoating resistant inkjet ink composition comprising:
   (a) a homopolymer or copolymer acidic resin with an inherent acid value of at least about 25 mg KOH/g;
   (b) a non-volatile monoamine organic acid neutralizing agent selected from the group consisting of an alcohol amine, an aromatic amine, a heterocyclic nitrogen compound, an alkyl amine, a quaternery ammonium hydroxide, and any mixture of one or more thereof, which is present at up to about 10% by weight of the ink composition;
   (c) at least 60% of one or more volatile organic solvents; and
   (d) one or more colorants, which is resistant to smearing by overcoating compositions and which contains less than 1% water.

11. The inkjet ink composition of claim 10, wherein the non-volatile organic acid neutralizing agent selected from the group consisting of triethylamine, dimethylamine, triethanolamine, dimethylethanolamine, methanolamine, N-methylethanolamine, ethanolamine, diethanolamine, tetrabutyl ammonium hydroxide, tetrapropyl ammonium hydroxide, tetraethyl ammonium hydroxide, tetramethyl ammonium hydroxide, and any mixture of one or more thereof.

12. The inkjet ink composition of claim 10, wherein the non-volatile organic acid neutralizing agent is selected from the group consisting of triethanolamine and tetrabutyl ammonium hydroxide.

13. The inkjet ink composition of claim 10, wherein the acidic resin is an acrylic resin comprising monomers selected from the group consisting of acrylic acid, methacrylic acid, an alkyl acrylate, a hydroxyalkyl methacrylate, styrene, vinyl acetate and any mixture thereof.

14. The inkjet ink composition of claim 10, wherein the acidic resin has an average weight-average of less than about 80,000 Daltons.

15. The inkjet ink composition of claim 10, wherein the organic acid neutralizing agent is present at up to about 5% by weight of the ink composition.

16. The inkjet ink composition of claim 10, wherein the acid neutralizing agent has a boiling point of at least about 5° C.

17. The inkjet ink composition of claim 10, wherein the one or more organic solvents are selected from the group consisting of a C1-C4 alcohol, a C3-C6 ketone, a C3-C6 ester, a C4-C8 ether, and any mixture thereof.

18. The inkjet ink composition of claim 10, wherein the one or more organic solvents is selected from the group consisting of methyl ethyl ketone, methyl propyl ketone, methyl isopropyl ketone, n-propyl acetate, isopropyl acetate, n-butyl acetate, t-butyl acetate, methanol, ethanol, propylene glycol monomethyl ether acetate and any mixture thereof.

19. A method of producing an overcoated printed mark comprising:
   (a) printing by continuous inkjet a mark on a substrate using the inkjet ink composition of claim 10;
   (b) allowing the printed mark to dry; and
   (c) placing a coating of an overcoating over the printed mark.

20. An overcoated printed mark comprising:
   (a) a overcoating resistant printed mark made using the inkjet ink composition of claim 10 and
   (b) an overcoating composition.

\* \* \* \* \*